March 31, 1925.                                                              1,531,638
A. ZAMBERLETTI
ATTACHMENT FOR STEERING MECHANISM OF AUTOMOBILES
Filed Oct. 18, 1924
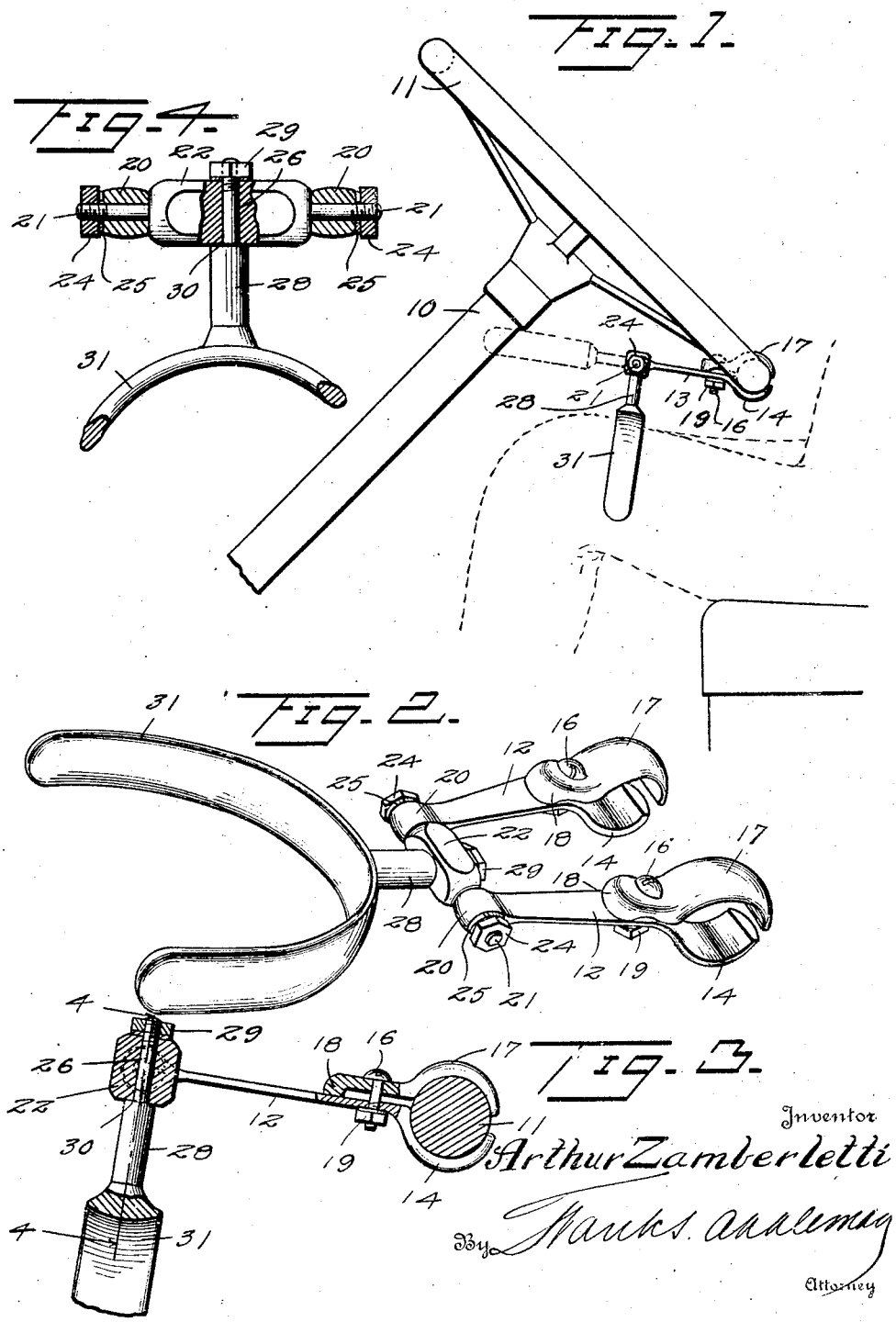
Inventor
Arthur Zamberletti Patented Mar. 31, 1925.

1,531,638

UNITED STATES PATENT OFFICE.

ARTHUR ZAMBERLETTI, OF CLINTON, INDIANA.

ATTACHMENT FOR STEERING MECHANISM OF AUTOMOBILES.

Application filed October 18, 1924. Serial No. 744,347.

*To all whom it may concern:*

Be it known that I, ARTHUR ZAMBERLETTI, a subject of the Kingdom of Italy, and resident of Clinton, in the county of Vermilion and State of Indiana, U. S. A., have invented certain new and useful Improvements in Attachments for Steering Mechanism of Automobiles, of which the following is a specification.

This invention relates to attachments for steering mechanism of automobiles, and particularly to a device adapted to be attached to a steering wheel or arm for communicating motion of the leg of an operator to the steering mechanism whereby the said operator may control the course of the automobile by moving his leg transversely and communicating the said motion to the steering mechanism, or, as in the present embodiment of the invention, to the steering wheel.

It is an object of this invention to provide means whereby the motion of the leg at a point remote from the hip joint is communicated to the steering mechanism, a condition which provides a greater degree of movement so that the operator may not be compelled to unduly exert himself while steering the automobile.

By reason of the production of this invention, an operator of an automobile may remove his hands from the steering wheel for the purpose of manipulating curtains, windows or the like, or he may light a cigar or the like, without liability of losing control of the automobile.

It is a further object of this invention to produce a steering attachment of the character indicated which can be secured to steering wheels now in common use, practically regardless of the size of the rim of the wheel, since the clamps are adjustable and capable of effective employment with rims of different sizes.

It is a still further object of this invention to provide joints between the manually engaged part of the steering device and the wheel which will permit the manually engaged part to be swung to positions clear of the operator and in positions to result in clearance for the operator to enter or leave his position under the steering wheel.

It is a still further object of this invention to produce a device of the character indicated which will be attractive in appearance, as well as efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in perspective of a fragment of a steering mechanism, showing a device embodying the invention applied thereto;

Figure 2 illustrates a perspective view of the invention detached;

Figure 3 illustrates a sectional view thereof; and

Figure 4 illustrates a detailed view of the device partly in section and partly in elevation.

In these drawings, 10 denotes a steering post and 11 a steering wheel which are of conventional type and need not be described in detail.

In the present embodiment of the invention, two arms 12 and 13 are employed which are of a length and shape to extend forwardly and somewhat upwardly from the steering wheel, and it is the purpose of the inventor that the arms should be secured to the rim of the steering wheel at its lowermost segment when the wheel is set for directing the automobile in a straight course, so that when motion is communicated to the arms to rotate the wheel in either direction, it will guide the automobile in the proper course. Each arm terminates in a half clamp or curved end 14 which partially embraces the rim of the steering wheel, and each arm has an aperture 15 extending through it for the reception of a bolt 16, or the like, which is intended for binding or holding the clamping elements in position.

A clamping element 17 is associated with each arm and it has a curved portion which partially embraces the side of the rim opposite that engaged by the clamping portion 14 of the arm. The clamping element 17 has a flange 18 at its inner end which bears against the arm with which it coacts as a fulcrum so that when the nut 19 is threaded on the bolt, it will bind the sections of each clamp against the rim of the wheel. The outer end of each arm has an eye 20 which receives a trunnion 21 of the head 22 so that the head is oscillatably mounted in approximately a horizontal position at the end of the arms.

In the present embodiment of the invention, the trunnions have their ends provided with threads 23 to receive nuts 24. Preferably lock washers 25 are interposed between the nuts and the outer surfaces of the arms, and the nuts bear against the lock washers to produce such frictional engagement with the arms as to hold the head in different positions of adjustment when the trunnions are turned in the arms. This provision insures that the head will be held in different positions of adjustment for purposes to be presently explained.

The head has an aperture 26 extending through it transversely and the aperture is intended to receive a shank 27 of a stud 28. The shank is threaded to engage a nut 29 and the stud has a shoulder 30 on it which serves to limit the axial movement of the shank in the head when the nut is threaded to retain the shank in the head. A yoke 31, which is semi-circular or approximately so, is secured on the stud and the said yoke is intended to embrace the top and sides of the leg of an operator near the knee so that when an operator oscillates his leg transversely, it will communicate motion to the steering wheel. The leverage is such in the arrangement of parts that slight effort or pressure is required in order to produce the desired result and maintain the course of the automobile without the use of the hands of the operator.

When it is desired to dispense temporarily with the leg steering mechanism, the head may be rotated and the yoke may be swung outwardly to an elevated position, where it will be held by reason of friction of the lock washers which engage the side surfaces of the arms.

A device made in accordance with the invention is of neat appearance, may be adjusted to permit free movement of the operator with respect to the steering mechanism, and leaves the device free to be manipulated by hand, as is now commonly done.

I claim:

1. In a steering mechanism for automobiles, arms having clamps by which they are secured to a steering wheel, the said arms extending forwardly and upwardly, a head trunnioned on the arms, and a yoke connected to the head and depending therefrom.

2. In a steering mechanism for automobiles, arms, means for securing the arms to an automobile steering wheel whereby the said arms extend forwardly of the wheel, a head having trunnions rotatable in the arms, a stud having a shank secured to the head, and a yoke carried by the stud.

3. In a steering mechanism for automobiles, arms having clamping elements integral with them, a clamping element coacting with each of the clamping elements of the arms, means for drawing the pairs of clamping elements into engagement with a steering wheel, a head rotatably mounted on the arms, a yoke adapted to partially embrace the leg of an operator, and means for suspending the said yoke from the head.

4. In a steering mechanism for automobiles, arms having clamping elements integral with them, a clamping element coacting with each of the clamping elements of the arms, means for drawing the pairs of clamping elements into engagement with a steering wheel, a head rotatably mounted on the arms, a yoke adapted to partially embrace the leg of an operator, and means for swiveling the yoke to the head.

5. In a steering mechanism for automobiles, arms having clamps by which they are secured to a steering wheel, the said arms extending forwardly and upwardly, a head trunnioned on the arms, a yoke, and a swivel connection between the yoke and the head.

ARTHUR ZAMBERLETTI.